United States Patent
Zhang et al.

(10) Patent No.: US 10,225,204 B2
(45) Date of Patent: *Mar. 5, 2019

(54) CONTENT BASED OVERLOAD PROTECTION

(71) Applicant: Telefonaktiebolaget LM Ericsson (publ), Stockholm (SE)

(72) Inventors: Jiangtao Zhang, Shanghai (CN); Bengt Johansson, Västra Frölunda (SE); Sten Rune Pettersson, Torslanda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/667,872

(22) Filed: Aug. 3, 2017

(65) Prior Publication Data
US 2017/0359269 A1   Dec. 14, 2017

Related U.S. Application Data

(63) Continuation of application No. 13/698,407, filed as application No. PCT/EP2012/072608 on Nov. 14, 2012, now Pat. No. 9,769,083.

(51) Int. Cl.
*H04L 12/26* (2006.01)
*H04L 12/865* (2013.01)
(Continued)

(52) U.S. Cl.
CPC ........ *H04L 47/6275* (2013.01); *H04L 47/122* (2013.01); *H04L 47/2441* (2013.01);
(Continued)

(58) Field of Classification Search
None
See application file for complete search history.

(56) References Cited

U.S. PATENT DOCUMENTS 8,339,959 B1   12/2012   Moisand et al.
2002/0176433 A1   11/2002   Zhu et al.
(Continued)

OTHER PUBLICATIONS

International Search Report and Written Opinion dated Mar. 7, 2013 in International Application No. PCT/EP2012/072608, 8 pages.
(Continued)

*Primary Examiner* — Bob A Phunkulh
(74) *Attorney, Agent, or Firm* — Rothwell, Figg, Ernst & Manbeck, p.c.

(57) ABSTRACT

An apparatus comprising a processor and interface for receiving and transmitting packets to external units. The interface comprises a first layer filter and first packet queues; the processor comprises a kernel, second layer filter, second packet queues and applications. For a packet received by the unit, the unit delivers parts the packet to the first layer filter; applies first level filtering; performs first sorting and delivers parts of the packet according to first level filtering rules and delivers parts of the packet to one of the first packet queues in dependence on the first sorting; the unit further being adapted for delivering the packet to second layer filter from kernel or from first packet queues; applying second level filtering; performing second sorting of parts of the packet and delivering parts of the packet to one of the applications in dependence on the second sorting.

13 Claims, 5 Drawing Sheets

(51) Int. Cl.
  *H04L 12/851* (2013.01)
  *H04L 12/803* (2013.01)
  *H04L 12/58* (2006.01)
  *H04L 29/06* (2006.01)

(52) U.S. Cl.
  CPC .......... *H04L 47/2483* (2013.01); *H04L 51/12* (2013.01); *H04L 63/02* (2013.01)

(56) References Cited

U.S. PATENT DOCUMENTS

| | | |
|---|---|---|
| 2006/0187830 A1 | 8/2006 | Nam |
| 2007/0061433 A1 | 3/2007 | Reynolds et al. |
| 2008/0155676 A1 | 6/2008 | Johnson et al. |
| 2010/0058459 A1 | 3/2010 | Li et al. |
| 2011/0010769 A1 | 1/2011 | Järredal |
| 2011/0044279 A1 | 2/2011 | Johansson et al. |
| 2011/0055916 A1 | 3/2011 | Ahn |
| 2011/0069663 A1 | 3/2011 | Shu et al. |
| 2011/0131646 A1 | 6/2011 | Park et al. |
| 2011/0246489 A1 | 10/2011 | Pope et al. |
| 2011/0317694 A1 | 12/2011 | Pleshek et al. |
| 2012/0106354 A1 | 5/2012 | Pleshek et al. |
| 2012/0264443 A1 | 10/2012 | Ng et al. |
| 2013/0250803 A1 | 9/2013 | Abraham et al. |

OTHER PUBLICATIONS

Official action dated Mar. 22, 2016 in corresponding European Application No. 12 790 845.7, 3 pages.

| MESSAGE PRIORITY | MESSAGE TYPE | QUEUE |
|---|---|---|
| 0 | Node Internal control commands | Q1_1 |
| 1 | Node internal messages | Q1_1 |
| 2 | ARP, OSPF, RIP, ICMP | Q1_2 |
| 3 | Echo request, Echo response(both GTP-C and GTP-U), version not supported indication (GTP-C) | Q1_2 |
| 4 | Error indication (both GTP-C and GTP-U) and GTP-U end marker | Q1_3 |
| 5 | GTP-C tunnel management and mobility management and others | Q1_4 |
| 6 | GTP-U payload(apply the second layer filtering rules) | Q1_n |

FIG. 5 – 1'ST LAYER FILTERING RULES - 1010

| MESSAGE PRIORITY | MESSAGE TYPE | | QUEUE |
|---|---|---|---|
| 0 | Conversational | ICMP, SNMP and SIP control messages | Q2_1 |
| 1 | | Instant message, VOIP | Q2_1 |
| 2 | Streaming | Audio, video | Q2_2 |
| 3 | Interactive | Web Browsing, GPS navigation, social network | Q2_3 |
| 4 | | Game, telnet, SSH | Q2_3 |
| 5 | Background and others | Picture, file share, POP3 and SMTP | Q2_4 |
| 6 | | P2P, FTP and other payload | Q2_n |

FIG. 6 – 2'ND LAYER FILTERING RULES - 1020

CONTENT BASED OVERLOAD PROTECTION

CROSS-REFERENCE TO RELATED APPLICATIONS

This application is a continuation of U.S. application Ser. No. 13/698,407, having a § 371(c) date Nov. 16, 2012 (published as US 20140254368), which is a 35 U.S.C. § 371 National Stage of International Application No. PCT/EP2012/072608, filed Nov. 14, 2012. The above identified applications and publication are incorporated by reference.

TECHNICAL FIELD

This invention is directed to resource management in information processing systems. More particularly, the invention pertains to serving gateway nodes (SGN) for processing communication packets and concerns overload protection in such nodes as well as to a method therefore.

BACKGROUND

Since hardware resources are not unlimited, it has been suggested in the art to use content-specific filtering as a means for securing resource management in processing nodes such as routers.

Such filtering involves that not only are the application and communication protocol classified, but the content exchanged should be inspected by deep packet inspection (DPI) and packet classification functionality.

Overload protection is a requirement for most network nodes and servers. The overload could concern processor, memory and input queues. Typical servers comprise network node boards comprising multi-core processors, multiple channels memory, multiple input queue and real time operating system. Such nodes handle signalling, which is computation intensive, and data traffic, which is IO intensive. Typically, a given limit to process messages is pre-set for the processors, memory, input queues and also for real time scheduling. Excessive amounts of signalling messages could lead to processor resources being overloaded, while excessive amounts of data traffic messages could lead to input queue resources being overflowed, especially under the burst of many data traffic requests.

When an overload occurs, two consequences may be "chosen". Either the boards/node crash due to lack of resources or packets are dropped. In both cases the node is not able to fulfil the QoS, latency or other requirements. The crash of the boards/node will cause a decreased service or complete loss of service; dropped packets will cause the system to become unstable, which will lead to a poor user experience.

Prior art document U.S. Pat. No. 2010/0067400 shows a serving gateway facing a radio access network that receives packets, applies deep packet inspect to classify the packet into a predetermined application class and inserts a marker identifying the class and a QoS associated with the class. The serving gateway assigns the packets to a queue within a default bearer based on the class and the QoS marker. The serving gateway transfers packets through the bearer by processing the queues in accordance with their priority.

Prior art document U.S. Pat. No. 7,522,581 shows server overload control methods for session initiation protocol servers. This document discusses that overload control. Overload control in general entails dropping messages in order to reduce load. Message dropping needs to happen early in the processing path of a message to minimize the amount of processing (CPU, I/O etc) resources spent on a message that will ultimately be dropped. U.S. Pat. No. 7,522,581 proposes among others the following different options for overload control: Support overload control at the network interface card (NIC) itself. While this allows a message to be dropped as early as possible, it requires additional processing support on a NIC. Another measure is to support overload control within the kernel. According to U.S. Pat. No. 7,522,581, overload control within the kernel eliminates the need for additional processing on the NIC, yet allows messages to be dropped before they are copied to the application, thus reducing the processing resources required compared to application-level support for overload control.

Prior art document U.S. Pat. No. 7,522,581 suggests a method for operating a server having a maximum capacity for servicing requests comprises the following steps: receiving a plurality of requests; classifying each request according to a value; determining a priority for handling the request according to the value, such that requests with higher values are assigned higher priorities; placing each request in one of multiple queues according to its priority value; and dropping the requests with the lowest priority when the plurality of requests are received at a rate that exceeds the maximum capacity.

Additionally, an embodiment of U.S. Pat. No. 7,522,581 is implementing a Linux Kernel. One implementation of the traffic classifier comprises four major components: 1. The classification engine itself, which parses SIP headers and maps messages to a class. 2. Interception of incoming SIP messages via TCP, UDP, and SSL and sending them to the classification engine. 3. After the incoming packet is classified, then an action is performed on this packet. 4. The configuration of the classifier and the actions to perform are transferred from user-level applications (e.g., static configuration scripts or the SIP Proxy) to the kernel.

The kernel-level classification engine operates exclusively on the tables defined in the algorithm, rather than the rules that define those tables. Supporting user-level programs convert the rule set into the tables before sending the tables into the kernel. Although the user-level compiler should create the tables correctly, the kernel performs limited verification to make sure the tables do not have invalid references.

SUMMARY

It is a first object of the invention to improve overload protection in a unit such as a GSN node.

This object has been accomplished by a unit comprising a processor and interface means adapted for receiving and transmitting packets to external units over a communication interface.

The interface means comprises a first layer filtering means operating according to first level filtering rules and first packet queues; while the processor comprises at least one kernel, second layer filtering means operating according to second level filtering rules, second packet and applications.

The unit is further adapted for delivering at least parts of a packet from a first packet queue to the second layer filtering means, possibly via a kernel; and delivering at least part of a packet in the second layer filtering means to a second packet queue to an application.

For a given packet received on the communication interface, the unit being adapted for delivering parts the packet to the first layer filtering means; applying first level filtering; performing first sorting according to the first level filtering rules and delivering parts of the packet to one of the first packet queues in dependence on the first sorting; the unit further being adapted for delivering the packet to second layer filtering means from kernel or from first packet queues; applying second level filtering; performing second sorting of parts of the packet according to the second level filtering rules and delivering parts of the packet to one of the applications in dependence on the second sorting.

According to a further aspect of the invention the unit is further being adapted for delivering at least parts of a packet from a first packet queue to a kernel and further to an application, thus bypassing the second layer filtering means.

According to further aspects of the invention the first packet queues are associated with a set of respective first priority levels; and wherein the second packet queues are associated with a set of second priority levels; the first and second layer rules being arranged such that lower priority packets are queued in respective queues of lower priority levels while high priority packets are queued in respective queues of higher priority levels, and such that for a given amount of high priority packets being accommodated for in queues of high priority levels, such high priority packets are delivered to applications, even for situations where queues of lower priority levels are being overflowed with low priority packets, such that not all of such low priority packets can be delivered to applications.

The unit may form an Evolved Node B node, eNB, mobility Management Entity, MME, Serving gateway, SGW or a Packet Data Net-work Gateway node, PGW node, for operating in an evolved packet core, EPC, network.

There is also provided a method for a unit comprising a processor and interface means adapted for receiving and transmitting packets to external units over a communication interface, the interface means comprising a first layer filtering means operating according to first level filtering rules and comprising first packet queues; the processor comprising at least one kernel, second layer filtering means operating according to second level filtering rules, second packet queues and applications.

The unit is further being adapted for delivering parts of a packet from a first packet queue to the second layer filtering means, possibly via a kernel; and delivering parts of a packet in the second layer filtering means to a second packet queue to an application.

The method comprises the steps of: receiving at least part of a packet on the communication interface, delivering parts of the packet to the first layer filtering means; applying first level filtering; performing first sorting and delivering parts of the packet according to the first level filtering rules and delivering parts of the packet to one of the first packet queues in dependence on the first sorting; from kernel or from first queues, delivering parts of the packet to second layer filtering means; applying second level filtering; performing second sorting on parts of the packet according to the second level filtering rules; and delivering parts of the packet to one of the applications in dependence on the sorting.

DETAILED DESCRIPTION

Figure 1:
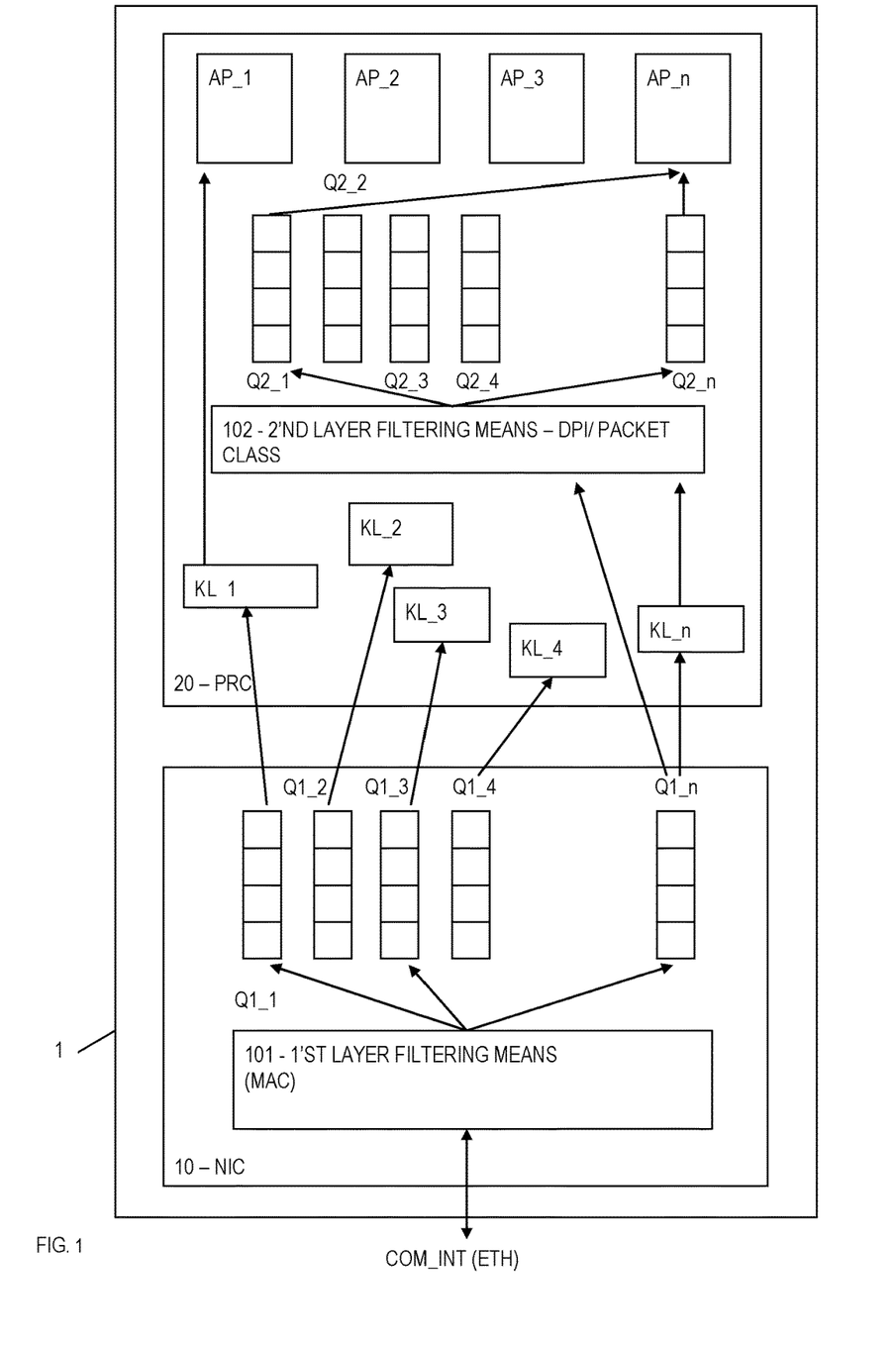
FIG. 1 shows a unit according to an embodiment of the invention, in which incoming traffic paths are indicated.

In FIG. 1, a unit 1 according to an embodiment of the invention is shown. The unit 1 comprises a processor 20, PRC, and interface means 10, adapted for receiving and transmitting packets 15, 17 to external units 1 over a communication interface COM_INT.

The interface means 10 comprises a first layer filtering means 101 operating according to first level filtering rules 1010 and first packet queues Q1_1-Q1_n.

The processor 20 comprises at least one kernel KL_1-KL_n, second layer filtering means 102 operating according to second level filtering rules 1020, second packet queues Q2_1-Q2_n and applications AP_1-AP_n. The applications running in the processor could be virtually any applications. Purely by example, a hypertext transfer protocol, HTTP, web server application and a GSM application could form the applications shown in FIG. 1. The packet queues could be implemented both in hardware and in software. An Intel VMDq (Virtual Machine Device Queue) or SR-IOV (Single Root 10 virtualization) could for instance be used as a hardware first layer packet filtering means. The interface means 10 could constitute a network interface card, NIC.

The unit 1 is further being adapted for delivering at least parts of a packet from a first packet queue to the second layer filtering means, 102, possibly via a kernel KL_1-KL_n; and delivering at least part of a packet in the second layer filtering means to a second packet queue to an application AP_1-AP_n.

The unit 1, could form an Evolved Node B node, eNB, a mobility Management Entity, MME, a Serving gateway, SGW, or a Packet Data Network Gateway node, PGW node, for operating in an evolved packet core, EPC, network. By example, the communication interface COM_INT could constitute an Ethernet (ETH) interface.

Figure 2:
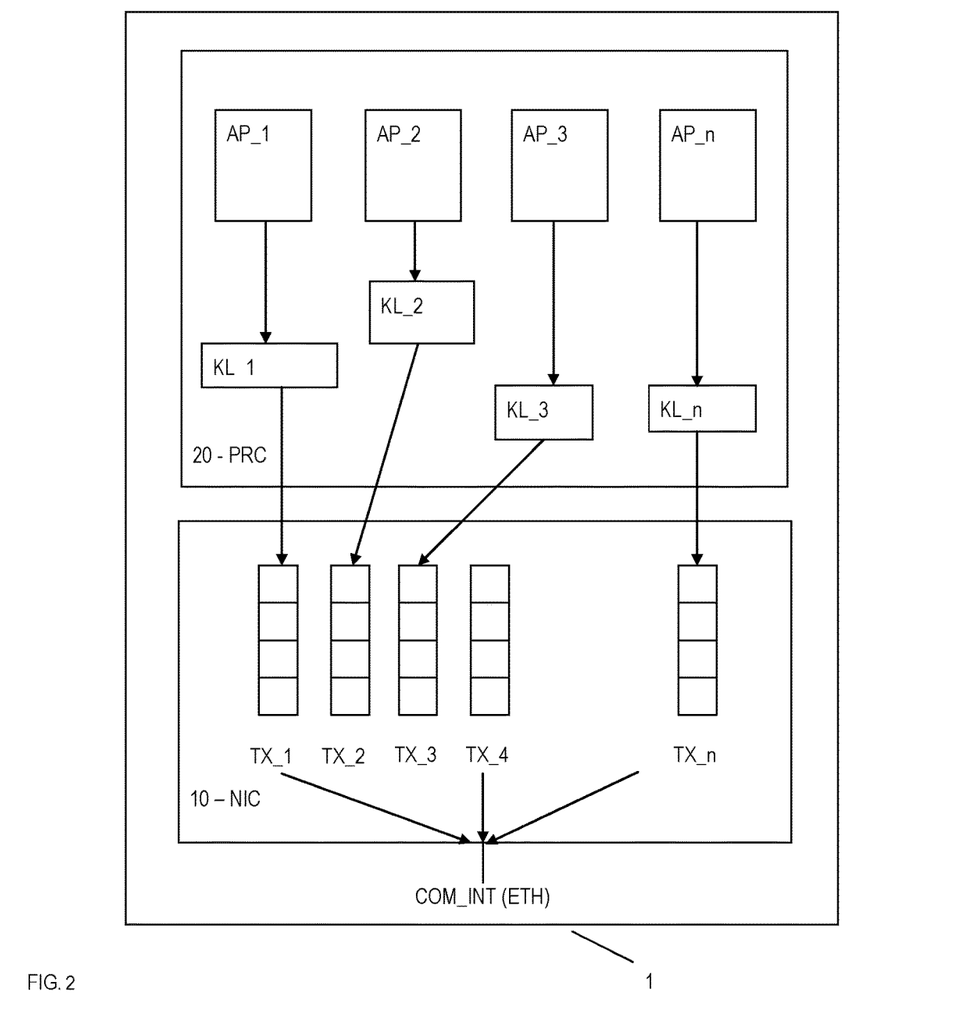
FIG. 2 shows further aspects of the unit of FIG. 1, in which outgoing traffic paths are indicated.

FIG. 2 shows further means of the unit 1, in which additional means for outgoing traffic has been indicated, namely outgoing filter transmit queues TX_1-TX_n residing in the network interface card NIC, 10. Each application, AP_1-AP_n, may send its outgoing traffic according to its transmit queue, one by one, via respective kernels, KL_1-KL_n. For example, TX_1 has the highest priority, while TX_n may have the lowest priority. Instead of having several queues TX_1-TX_n, a single queue could be arranged (not shown). In that case, there will be no priority control to the outgoing traffic, and traffic is transmitted in a FIFO (First Input First Output) manner. The outgoing traffic may be transmitted through the communication interface COM_INT.

Figure 3:
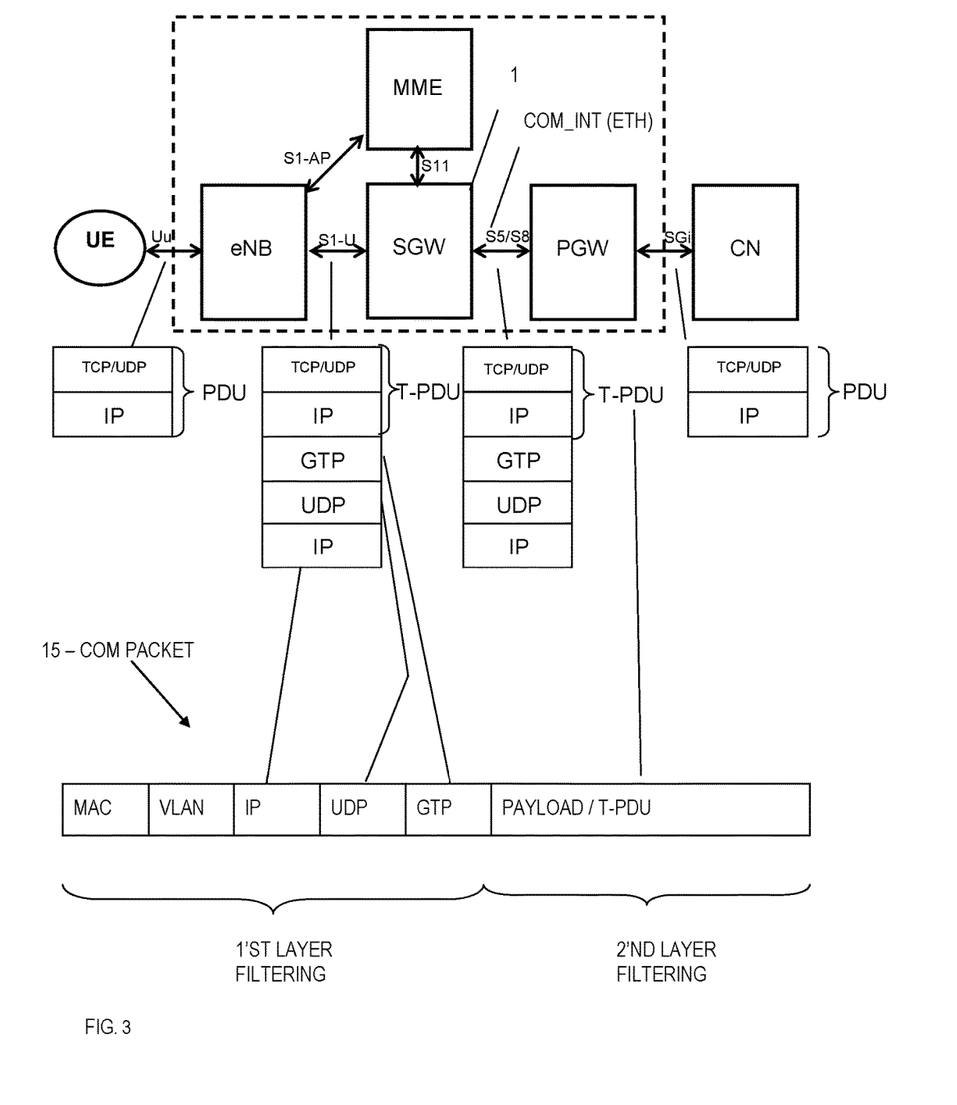
FIG. 3 shows a network according to the invention in which the unit shown in FIGS. 1 and 2, is used for implementations on SGW/PGW nodes, and in which filtering is performed on a communication packet in the network.

FIG. 3, shows a network in which the unit 1 may advantageously be embodied as a Evolved Node B node, eNB, mobility Management Entity, MME, Serving gateway, SGW or a Packet Data Network Gateway node, PGW node, for instance in evolved packet core, EPC, networks as is known from the 3GPP release 11 suite of standards for mobile communication, c.f. for instance 3GPP TS 23.002 V11.4.0, 2012-09, 3rd Generation Partnership Project; Technical Specification Group Services and System Aspects; Network architecture, FIG. 1b.

In FIG. 3, a communication packet 15 is illustrated travelling from the user entity UE over the Uu interface to eNB, over S1-U interface to SGW, over S5/S8 interface to PGW of such an evolved packet core, EPC, network and further over interface SGi to a so-called Corresponding Node, CN.

The communication packet, which comprises in part at least a TCP/UDP segment and an IP segment—here forming a packet data unit, PDU—is conveyed by means of a GPRS tunnel in the EPC network in which the packet is encapsulated in a communication packet, COM_INT 15, having an IP header, comprising further a UDP header and a GTP header. In the EPC network the PDU is considered as a T-PDU, Transport PDU, which corresponds to the payload of the packet conveyed. The content of the T-PDU is unknown.

As illustrated in FIG. 3, the communication packet has also a Media Access Control header and a Virtual Local Area Network header is provided.

It applies for a GTP-C (GPRS tunnel protocol-control plane) procedure (GTPv2):

The MME will create session via S11 interface to SGW, from the SGW to the PGW.

A create session request will be sent from the MME to the SGW and from the SGW to the PGW. A create session response message is sent from PGW to SGW, and then from SGW to MME via S11 interface. The PGW may create a bearer to SGW, from SGW to MME. A create bearer request is sent from PGW to SGW, and from SGW to MME. A create bearer response shall be sent from MME to SGW via S11, from SGW to PGW.

For a GTP-U (GPRS tunnel protocol-control plane) (GTPv1 only):

User entity UE packet data unit, PDU, traffic will be encapsulated into T-PDU by eNB, it will be sent to SGW via the S1-U interface. SGW will relay this message to PGW via the S5 or the S8 interface and vice versa. Echo request, echo response, error indication and version not supported messages are signaled between the adjacent nodes (eNB, MME, SGW and PGW), on both the GTP-C and the GTP-U path.

So for the SGW node, the incoming packets are GTP-C (from MME or PGW) and GTP-U (eNB or PGW). For the PGW node, the incoming packets are GTP-C and GTP-U (from SGW). For the MME node, there appear GTP-C messages and S1-AP messages. For the eNB node, there appear GTP-U and S1-AP messages.

According to embodiments of the invention, filtering according to first layer filtering rules 1010 is applied on the MAC, VLAN, IP, UDP and GTP segments, while filtering according to second layer filtering rules 1020 is applied on the payload, T-PDU as will be explained in the following. Different VLAN-id's may be used to indicate different priorities.

Returning to FIG. 1, for a given packet received on the communication interface COM_INT, the unit is adapted for: delivering 12 parts the received packet to the first layer filtering means 101; applying first level filtering 14; performing first sorting 16 and delivering parts of the packet according to the first level filtering rules 201 and delivering parts of the packet to one of the first packet queues Q1_1-Q1_n in dependence on the first sorting.

Alternatively, parts of packets are delivered from a kernel to an application instead of to the second level filtering means 102, as shown from kernel KL_1 to application AP_1. Packets can moreover be transparently passed through kernel as a fast path solution to make applications read packets from hardware queues directly.

Subsequently, the unit provides for delivering 16, 18 parts of the packet to second layer filtering means 102 from kernel or from first packet queues.

Finally, the unit is applying 24 second level filtering; performing second sorting 26 of parts of the packet according to the second level filtering rules 201 and delivering 28 parts of the packet to one of the applications in dependence on the sorting AP_1-AP_n.

Figure 4:
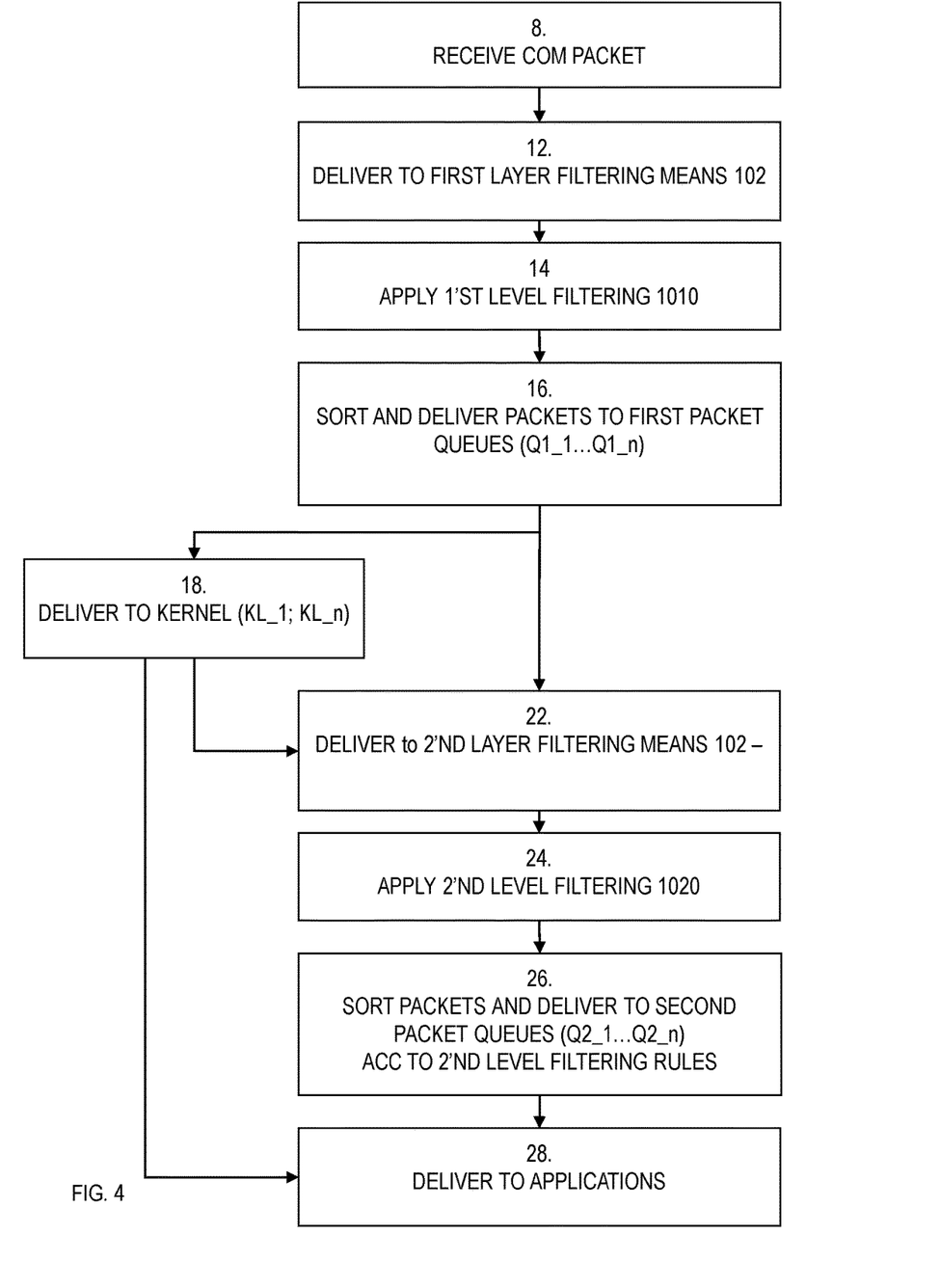
FIG. 4 shows an embodiment of a method for the unit shown in FIGS. 1 and 2.

The method, according to which the unit 1 may operate, has been further illustrated in FIG. 4.

In step 8, an incoming packet is received in the unit 1 on the communication interface COM_INT which may for instance be an Ethernet interface, ETH.

The packet or parts of the packet is delivered step 12 to first layer filtering means 102. In the first layer filtering means, 1'st layer filtering is performed according to first layer filtering rules 1010, step 14.

Depending on the category in which the parts of the packet falls, parts of the packet is sorted and delivered to any of the first packet queues Q1_1-Q1_n, step 16.

Depending on the tasks needed to be performed, the unit 1 delivers at least parts of the packet from a respective first packet queue where the packet resides to the second layer filtering means, step 22, possibly via a kernel KL_1-KL_n, step 18; and delivers at least part of a packet in the second layer filtering means to a second packet queue to an application AP_1-AP_n. Alternatively, parts of packets are delivered from a kernel to an application, thus bypassing the second level filtering means 102, as shown from kernel KL_1 to application AP_1. A first queue Q1_1 is arranged to be associated with a first kernel, KL_1, which leads exclusively to a given application, e.g. AP1, in dependence with an address resolution in that kernel. Thereby, the second level filtering is bypassed. This route, from step 18 to step 28, may pertain to high priority packet. In a still further embodiment, only a single first queue, Q1_n, represents a route to the second layer filtering means.

In the second layer filtering means, second level filtering is applied, step 24; and second sorting step 26 of parts of the packet according to the second level filtering rules 201 is carried out, such that parts of a packet is distributed to any of the second packet queues in accordance with the second level filtering, 1020.

Finally, parts of the packet are delivered 28 to one of the applications in dependence on the sorting AP_1-AP_n.

Advantageously, the first packet queues Q1_1-Q1_n are associated with a set of respective first priority levels 0-6; and the second packet queues Q2_1-Q2_n are associated with a set of second priority levels 0-6.

The first 1010 layer filtering rules are providing that lower priority packets are queued in respective queues of lower priority levels 4-6 while high priority packets are queued in respective queues of higher priority levels 0-3.

The second layer rules 1020 are moreover arranged such that lower priority packets are queued in respective queues of lower priority levels 4-6 while high priority packets are queued in respective queues of higher priority levels 0-3.

In this manner it is accomplished that for a given amount of high priority packets being accommodated for in queues of high priority levels, such high priority packets are delivered to applications AP_1-AP_n, despite queues of lower priority levels are being overflowed with low priority packets, and hence for situations where not all of such low priority packets can be delivered to applications.

It is understood that it is a dimensioning task to secure that the queues can accommodate a sufficient amount of high priority packets to meet the above performance aspect. In this context, it is understood that the notion high priority in relation to low priority packets, are used in a relative sense i.e. that a high priority packet has a higher priority than a low priority packet.

According to one embodiment of the invention, the first layer filtering in step 14 is applied on at least one field out of the Media Access Control, MAC, field, Virtual Local Area Network, VLAN, field, Internet Protocol, IP, field, User Datagram Protocol, UDP, field or GRPS Tunneling Protocol, GTP, field of a given packet received on the communication interface COM_INT.

According to an embodiment of the invention, the distribution of packets to the second layer filtering is applied only for GTP-user, GTP-U, payload of a given packet received on the communication interface COM_INT.

Figure 5:
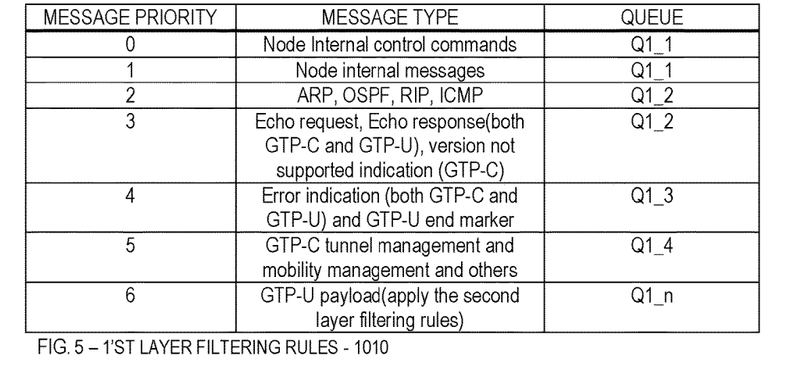
FIG. 5 shows an embodiment for first filtering rules according to an embodiment of the invention.

In FIG. 5, shows in tabular form the first layer filtering rules 1010 as expressed by message priorities and message types and the corresponding sorting into first packet queues, Q1_1-Q1_n.

In an embodiment the filtering 14 is applied on one of: 0—node internal control commands; 1—node internal messages; 2—Address Resolution Protocol, ARP; Open Shortest Path First, OSPF; Routing Information Protocol, RIP; Internet Control Message Protocol, ICMP; 3—echo request and echo response (both GTP-C and GTP-U); version not supported indication (GTP-C) 4—error indication (both GTP-C and GTP-U) and GTP-U end marker; 5—GTP-control plane, GTP-C, tunnel management and mobility management and others. 6—GTP-user plane, GTP-U, payload.

In a further embodiment it is provided that node internal control commands; and node internal messages; have a higher priority than Address Resolution Protocol, ARP; Open Shortest Path First, OSPF; Routing Information Protocol, RIP; Internet Control Message Protocol, ICMP.

In a further embodiment, the priorities are in the order mentioned above, such that Node internal control commands have the highest priority—message priority 0—and GTP-U payload has the lowest priority—message priority 6.

For the context shown in FIG. 3, only the packet queue Q1_n—accommodating payload/T-PDU's—is subject to second layer filtering in the second layer filtering means 102. The other queues Q1_1-Q1_4 are delivered to kernels KL_1-KL_3, which may be further delivered to applications AP_1-AP-n without being subject to further filtering.

Figure 6:
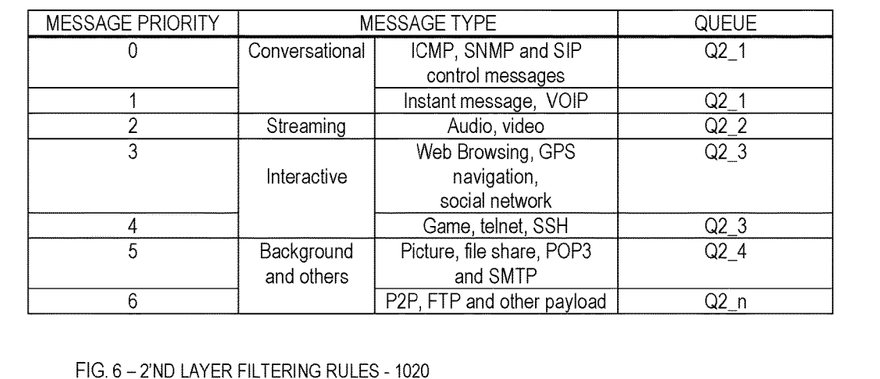
FIG. 6 shows an embodiment for second filtering rules according to an embodiment of the invention.

In FIG. 6, the second layer filtering rules 1020 are shown as expressed by message priorities and message types and the corresponding sorting into second packet queues, Q2_1-Q2_n.

The 2'nd layer filtering is applied on one of the following types of traffic:

Conversational, -Streaming, -Interactive, -Background and others. Conversational traffic may be the SIP, instance messages or VOIP. Streaming traffic may be audio and video. Interactive may be the telnet and www or social network. Background traffic may be FTP, P2P, POP3 or SMTP. Generally speaking, conversational has the highest priority and background has the lowest priority.

The 2'nd layer filtering may be applied on one of: 0—ICMP, SNMP, Session Initiation Protocol, SIP; 1—Instant messages, Voice over IP, VOIP; 0 and 1 constituting conversational traffic; 2—Audio and Video; constituting streaming traffic; 3—Web, browsing/Global Positioning System, GPS, navigation, social network; 4—Game, Telnet and SSH; 3 and 4 constituting interactive services; 5—Picture and File share, Post Office Protocol, POP3, and Simple Mail Transfer Protocol, SMTP; 6—Peer to peer, P2P, File Transfer Protocol, FTP and further payload; 5 and 6 constituting background and other traffic.

In a further embodiment it is provided that ICMP, SNMP, Session Initiation Protocol, SIP; Instant messages; have a higher priority than—Post Office Protocol, POP3, and Simple Mail Transfer Protocol, SMTP; Peer to peer, P2P, File Transfer Protocol, FTP and further payload.

In a still further embodiment, the priorities are in the order mentioned above, such that ICMP, Session Initiation Protocol, SIP control messages; have the highest priority—message priority 0; and Peer to peer, P2P, File Transfer Protocol, FTP and further payload has the lowest priority-message priority 6.

On the SGW or PGW node, according to embodiments of the invention, packet classification or DPI technology is used to identify the T-PDU type, it may be SIP message, web browsing, social network, voice over IP, game, mail or file share, peer-to-peer, p2p, traffic. In the second layer filtering, GTP-U is being given the "right priority" in real time and based on relevant configurations for the application.

Among the advantages for the embodiments above, it is noted that high priority messages in the system will not be dropped under overload. This improves system robustness and stability. According to embodiments of the invention, it is provided that only a certain type of messages is subject to second layer filtering. In case the second layer filtering constitutes a computational extensive processing—which may be the case for deep packet inspection—the overall system performance may be rendered substantially unaffected by such second layer filtering.

The invention claimed is:

1. An apparatus, the apparatus comprising:
a processor for running a plurality of applications, the plurality of applications comprising a first application and a second application; and
a network interface that is separate and distinct from said processor, said network interface comprising a communication interface for receiving and transmitting packets to external units over a network, a first layer filter, and a plurality of first layer packet queues, the plurality of first layer packet queues comprising a first packet queue and a second packet queue, wherein
the processor comprises: a first kernel, a second layer filter, and a plurality of second layer packet queues, the plurality of second layer packet queues comprising a third packet queue and a fourth packet queue,
for a certain first packet received on the communication interface, the apparatus is configured to: deliver at least a part of the first packet to the first layer filter, which is configured to select one of the plurality of first layer packet queues for storing at least a part of the first packet; store at least a part of the first packet in the selected first layer packet queue; and deliver at least a part of the first packet to the second layer filter, which is configured to select one of the plurality of second layer packet queues for storing at least a part of the first packet, and
for a certain second packet received on the communication interface, the apparatus is further configured to: deliver at least a part of the second packet to the first layer filter, which is configured to select one of the plurality of first layer packet queues for storing at least a part of the second packet; store at least a part of the second packet in the selected first layer packet queue; and deliver at least the stored part of the second packet to the first kernel, which is configured to select one of the plurality of applications and provide at least the stored part of the second packet to the selected application.

2. The apparatus of claim 1, wherein
the first packet queues are associated with a set of respective first priority levels, and
the second packet queues are associated with a set of second priority levels.

3. The apparatus of claim 2, wherein lower priority packets are queued in respective queues of lower priority levels while high priority packets are queued in respective queues of higher priority levels, and such that for a given amount of high priority packets being accommodated for in queues of high priority levels, such high priority packets are delivered to applications, despite queues of lower priority levels are being overflowed with low priority packets, such that not all of such low priority packets can be delivered to applications.

4. The apparatus of claim 1, wherein
the first layer filter is configured to select one of the plurality of first layer packet queues for storing at least a part of the first packet based at least in part on information included in a header of the first packet, wherein the header is one of: a Media Access Control (MAC) header, an Internet Protocol (IP) header, User Datagram Protocol (UDP) header, and a GRPS Tunneling Protocol (GTP) header, and
the second layer filter is configured to select one of the plurality of second layer packet queues for storing at least a part of the first packet based at least in part on information included in a GTP-user (GTP-U) payload portion of the first packet.

5. The apparatus of claim 1, wherein
the first layer filter is configured to determine a message type based on information included in the first packet, and
the first layer filter is configured to select one of the plurality of first layer packet queues for storing at least a part of the first packet based at least in part on the determined message type.

6. The apparatus of claim 1, the apparatus is one of: an Evolved Node B node (eNB), mobility Management Entity (MME), Serving gateway (SGW) or a Packet Data Network Gateway node (PGW node).

7. A method in an apparatus for processing packets, the apparatus comprising: (1) a network interface, said network interface comprising a communication interface for receiving and transmitting packets to external units over a network, a first layer filter, and a plurality of first layer packet queues, the plurality of first layer packet queues comprising a first packet queue and a second packet queue, and (2) a processor for running a plurality of applications, the plurality of applications comprising a first application and a second application, the processor comprising: a first kernel, a second layer filter, and a plurality of second layer packet queues, the plurality of second layer packet queues comprising a third packet queue and a fourth packet queue, the method comprising:
receiving a first packet;
delivering at least a part of the first packet to the first layer filter;
the first layer filter selecting one of the plurality of first layer packet queues for storing at least a part of the first packet;
storing at least a part of the first packet in the selected first layer packet queue;
delivering at least a part of the first packet to the second layer filter;
the second layer filter selecting one of the plurality of second layer packet queues for storing at least a part of the first packet;
receiving a second packet;
delivering at least a part of the second packet to the first layer filter;
the first layer filter selecting one of the plurality of first layer packet queues for storing at least a part of the second packet;
storing at least a part of the second packet in the selected first layer packet queue;
delivering at least the stored part of the second packet to the first kernel;
the first kernel selecting one of the plurality of applications; and
providing at least the stored part of the second packet to the selected application.

8. The method of claim 7, wherein
the first packet queues are associated with a set of respective first priority levels, and
the second packet queues are associated with a set of second priority levels.

9. The method of claim 8, wherein lower priority packets are queued in respective queues of lower priority levels while high priority packets are queued in respective queues of higher priority levels, and such that for a given amount of high priority packets being accommodated for in queues of high priority levels, such high priority packets are delivered to applications, despite queues of lower priority levels are being overflowed with low priority packets, such that not all of such low priority packets can be delivered to applications.

10. The method of claim 7, wherein
the first layer filter is configured to select one of the plurality of first layer packet queues for storing at least a part of the first packet based at least in part on information included in a header of the first packet, wherein the header is one of: a Media Access Control (MAC) header, an Internet Protocol (IP) header, User Datagram Protocol (UDP) header, and a GRPS Tunneling Protocol (GTP) header, and
the second layer filter is configured to select one of the plurality of second layer packet queues for storing at least a part of the first packet based at least in part on information included in a GTP-user (GTP-U) payload portion of the first packet.

11. The method of claim 7, wherein
the first layer filter is configured to determine a message type based on information included in the first packet, and
the first layer filter is configured to select one of the plurality of first layer packet queues for storing at least a part of the first packet based at least in part on the determined message type.

12. The method of claim 7, the apparatus is one of: an Evolved Node B node (eNB), mobility Management Entity (MME), Serving gateway (SGW) or a Packet Data Network Gateway node (PGW node).

13. The method of claim 7, wherein
the processor further comprises a second kernel, and
delivering at least a part of the first packet to the second layer filter comprises: the second kernel obtaining at least a first part of the first packet from the first layer packet queue in which at least the first part of the first packet is stored and the second kernel providing at least the first part of the first packet to the second layer filter.

* * * * *